United States Patent
Yang (10) Patent No.: US 10,628,110 B2
(45) Date of Patent: Apr. 21, 2020

(54) MULTI-SCREEN DISPLAY MANAGEMENT SYSTEM, DISPLAY DRIVING METHOD AND SCREEN SWITCHING METHOD

(71) Applicant: BOE TECHNOLOGY GROUP CO., LTD., Beijing (CN)

(72) Inventor: Xiangdong Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 97 days.

(21) Appl. No.: 15/710,888

(22) Filed: Sep. 21, 2017

(65) Prior Publication Data
US 2018/0113665 A1     Apr. 26, 2018

(30) Foreign Application Priority Data
Oct. 26, 2016   (CN) .......................... 2016 1 0960815

(51) Int. Cl.
*G06F 3/14*     (2006.01)
*G09G 5/00*     (2006.01)
*G06F 3/0482*   (2013.01)

(52) U.S. Cl.
CPC .......... *G06F 3/1446* (2013.01); *G06F 3/0482* (2013.01); *G06F 3/1423* (2013.01); *G06F 3/1431* (2013.01); *G09G 5/006* (2013.01)

(58) Field of Classification Search
CPC ..... G09G 5/006; H04N 21/472; H04N 21/435
See application file for complete search history.

(56) References Cited

U.S. PATENT DOCUMENTS

2005/0268236 A1*  12/2005  Kosaka ................. G09G 5/363
                                                                715/718
2008/0239160 A1   10/2008  Ho et al.
(Continued)

FOREIGN PATENT DOCUMENTS

CN            1156304        8/1997
CN         101291398 A      10/2008
(Continued)

OTHER PUBLICATIONS

First Office Action dated Dec. 20, 2018 corresponding to Chinese application No. 201610960815.3.

*Primary Examiner* — Kevin M Nguyen
(74) *Attorney, Agent, or Firm* — Nath, Goldberg & Meyer; Joshua B. Goldberg; Daniel J. Bissing (57) ABSTRACT

A multi-screen display management system to effectively manage multi-screen display by creating a screen management list to establish correspondence between each display screen and signal input port. The multi-screen display management system includes a signal input module, a screen management module, a list modification module, a mode management module and a driving module. The screen management module stores a screen management list, in which multiple display screens are pre-defined and a signal input port corresponding to each display screen is recorded. The list modification module is configured to modify the screen management list according to user's operation. The mode management module is configured to determine an active screen in the screen management list according to user's operation. The driving module is configured to drive the display device to display each active screen.

3 Claims, 3 Drawing Sheets

(56) References Cited

U.S. PATENT DOCUMENTS

| | | | | |
|---|---|---|---|---|
| 2010/0138780 A1* | 6/2010 | Marano | ................ | G06F 3/1415 |
| | | | | 715/804 |
| 2013/0053140 A1* | 2/2013 | Steil | ................... | G07F 17/3211 |
| | | | | 463/30 |
| 2014/0043210 A1* | 2/2014 | Stein | ...................... | G06F 9/452 |
| | | | | 345/2.1 |
| 2015/0150066 A1* | 5/2015 | Park | .................... | H04N 21/478 |
| | | | | 725/110 |

FOREIGN PATENT DOCUMENTS

| | | |
|---|---|---|
| CN | 101729811 | 6/2010 |
| CN | 101803375 A | 8/2010 |
| CN | 105430296 A | 3/2016 |
| CN | 205123925 U | 3/2016 |

\* cited by examiner

MULTI-SCREEN DISPLAY MANAGEMENT SYSTEM, DISPLAY DRIVING METHOD AND SCREEN SWITCHING METHOD

CROSS-REFERENCE TO RELATED APPLICATION

This application claims priority to Chinese Patent Application No. 201610960815.3, filed on Oct. 26, 2016, the contents of which are incorporated by reference in the entirety.

TECHNICAL FIELD

The present invention relates to the field of display technology, and particularly relates to a multi-screen display management system, a display driving method and a screen switching method.

BACKGROUND

An existing multi-screen display system includes therein only one signal input module having a plurality of signal input ports, and an existing multi-screen management method performs signal input management on a single signal input module only.

However, the number of signal input ports that can be provided on a single signal input module is limited, provision of a plurality of signal input modules is bound to be a future trend, and thus, providing a multi-screen display management system which is suitable for signal input management of both a single signal input module and multiple signal input modules is an urgent technical problem to be solved in the field.

SUMMARY

The present disclosure provides a multi-screen display management system, including:

a plurality of signal input modules each comprising a plurality of signal input ports;

a screen management module storing a screen management list, wherein in the screen management list, a plurality of display screens are predefined and a signal input port corresponding to each of the display screens is recorded;

a list modification module configured to modify the screen management list according to an operation of a user;

a mode management module configured to determine an active screen in the screen management list according to the operation of the user, wherein the active screen is a display screen that is being displayed on a display device currently, and a non-active screen is a display screen that is not being displayed on the display device currently; and a driving module configured to drive the display device to display each active screen according to a display signal inputted through the signal input port corresponding to each active screen recorded in the screen management list.

Optionally, the list modification module comprises:

a first determination unit configured to determine, when the user chooses to switch a current input port corresponding to a selected active screen on the display device to a target input port, whether a non-active screen that takes the target input port as its corresponding signal input port exists in the screen management list; and a first modification unit configured to modify the signal input port corresponding to the active screen selected by the user to be the target input port and modify the signal input port corresponding to the non-active screen to be the current input port in the screen management list when the first determination unit determines that the non-active screen that takes the target input port as its corresponding signal input port exists in the screen management list, wherein the driving module is further configured to drive, after the first modification unit has modified the screen management list, the display device to display each active screen according to the modified screen management list.

Optionally, the list modification module further comprises:

a second modification unit configured to modify the signal input port corresponding to the active screen selected by the user to be the target input port in the screen management list when the first determination unit determines that the non-active screen that takes the target input port as its corresponding signal input port does not exist in the screen management list;

a counting unit configured to count, after the second modification unit has modified the screen management list, a total number of signal input ports that belong to the signal input module comprising the target input port in the modified screen management list; and a second determination unit configured to determine whether the total number of signal input ports counted by the counting unit is larger than a maximum allowable port number of the signal input module comprising the target input port, wherein the driving module is further configured to drive, when the second determination unit determines that the total number of signal input ports counted by the counting unit is smaller than or equal to the maximum allowable port number of the signal input module comprising the target input port, the display device to display each active screen according to the screen management list modified by the second modification unit.

Optionally, the list modification module further comprises:

a third determination unit configured to determine whether a non-active screen whose corresponding signal input port belongs to the same signal input module as the target input port exists in the screen management list when the second determination unit determines that the total number of signal input ports counted by the counting unit is larger than the maximum allowable port number of the signal input module comprising the target input port;

a third modification unit configured to select, from the screen management list, one non-active screen whose corresponding signal input port belongs to the same signal input module as the target input port and modify the signal input port corresponding to said one non-active screen to be the current input port when the third determination unit determines that the non-active screen whose corresponding signal input port belongs to the same signal input module as the target input port exists in the screen management list; and a fourth modification unit configured to modify the signal input port corresponding to the active screen selected by the user from the target input port to the current input port in the screen management list when the third determination unit determines that the non-active screen whose corresponding signal input port belongs to the same signal input module as the target input port does not exist in the screen management list.

Optionally, the multi-screen display management system further comprises:

an alternative port generation module configured to generate an alternative port list for each active screen according to the screen management list, wherein a signal input port other than the signal input port corresponding to the active screen and a specific signal input port preset in the screen management list is recorded in the alternative port list corresponding to the active screen.

Optionally, the driving module comprises:

a signal input management unit configured to establish a channel between the signal input port corresponding to each active screen recorded in the screen management list and the display device so as to allow the signal input port corresponding to each active screen to input a corresponding data stream to the display device.

Optionally, a maximum supportable resolution corresponding to each display screen is recorded in the screen management list; and the driving module further comprises:

a resolution determination unit configured to determine whether the maximum supportable resolution corresponding to each active screen is smaller than a resolution of the data stream inputted through the signal input port corresponding to the active screen; and when the resolution determination unit determines that the maximum supportable resolution corresponding to the active screen is smaller than the resolution of the data stream provided through the signal input port corresponding to the active screen, the display device does not display said active screen.

Optionally, the multi-screen display management system further comprises:

a screen processing module configured to adjust a size of each active screen displayed on the display device.

Optionally, the multi-screen display management system further comprises:

a multi-screen display matrix module configured to adjust layout of each active screen displayed on the display device.

Optionally, the number of the plurality of signal input modules is two, wherein each of the signal input ports in one of the signal input modules is configured to provide a 2D video data stream, and each of the signal input ports in the other of the signal input modules is configured to provide a 3D video data stream.

To achieve the above object, the present disclosure also provides a display driving method based on the above multi-screen display management system, and the display driving method comprises:

determining, by the mode management module, an active screen in the screen management list according to an operation of a user; and driving, by the driving module, a display device to display each active screen according to the active screen determined by the mode management module and the signal input port corresponding to each active screen recorded in the screen management list.

To achieve the above object, the present disclosure also provides a screen switching method based on the above multi-screen display management system, wherein the list modification module comprises a first determination unit and a first modification unit, and the screen switching method comprises:

determining, by the mode management module, an active screen in the screen management list according to an operation of a user;

determining, by the first determination unit, whether a non-active screen that takes a target input port as its corresponding signal input port exists in the screen management list when the user chooses to switch a current input port corresponding to a selected active screen on the display device to the target input port;

modifying, by the first modification unit, the signal input port corresponding to the active screen selected by the user to be the target input port and the signal input port corresponding to the non-active screen to be the current input port in the screen management list, when the first determination unit determines that the non-active screen that takes the target input port as its corresponding signal input port exists in the screen management list; and driving, by the driving module the display device to display each active screen according to a display signal inputted through the signal input port corresponding to each active screen recorded in the modified screen management list after the first modification unit has modified the screen management list.

Optionally, the list modification module further comprises: a second modification unit, a counting unit and a second determination unit; and the screen switching method comprises:

modifying, by the second modification unit, the signal input port corresponding to the active screen selected by the user to be the target input port in the screen management list when the first determination unit determines that the non-active screen that takes the target input port as its corresponding signal input port does not exist in the screen management list;

counting, by the counting unit, a total number of signal input ports that belong to the signal input module comprising the target input port in the modified screen management list after the second modification unit has modified the screen management list;

determining, by the second determination unit, whether the total number of signal input ports counted by the counting unit is larger than a maximum allowable port number of the signal input module comprising the target input port; and driving, by the driving module, the display device to display each active screen according to a display signal inputted through the signal input port corresponding to each active screen recorded in the screen management list modified by the second modification unit, when the second determination unit determines that the total number of signal input ports counted by the counting unit is smaller than or equal to the maximum allowable port number of the signal input module comprising the target input port.

Optionally, the list modification module further comprises: a third determination unit, a third modification unit and a fourth modification unit; and the screen switching method comprises:

determining, by the third determination unit, whether a non-active screen whose corresponding signal input port belongs to the same signal input module as the target input port exists in the screen management list, when the second determination unit determines that the total number of signal input ports counted by the counting unit is larger than the maximum allowable port number of the signal input module comprising the target input port;

selecting, from the screen management list, one non-active screen whose corresponding signal input port belongs to the same signal input module as the target input port and modifying the signal input port corresponding to said one non-active screen to be the current input port by the third modification unit, when the third determination unit determines that the non-active screen whose corresponding signal input port belongs to the same signal input module as the target input port exists in the screen management list;

driving, by the driving module, the display device to display each active screen according to a display signal inputted through the signal input port corresponding to each active screen recorded in the screen management list modified by the third modification unit, after the third modification unit has modified the screen management list; and modifying, by the fourth modification unit, the signal input port corresponding to the active screen selected by the user from the target input port to the current input port in the screen management list when the third determination unit determines that the non-active screen whose corresponding signal input port belongs to the same signal input module as the target input port does not exist in the screen management list.

DETAILED DESCRIPTION

To enable those skilled in the art to better understand technical solutions of the present disclosure, a multi-screen display management system, a display driving method and a screen switching method provided by the present disclosure will be described in details below in conjunction with the accompanying drawings.

First Embodiment

Figure 1:
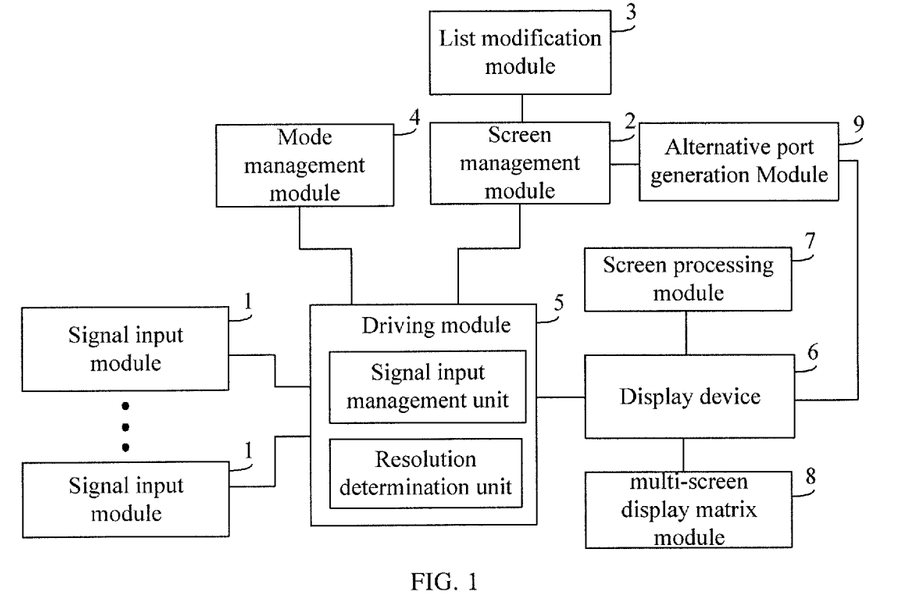
FIG. 1 is a structural schematic diagram of a multi-screen display management system provided by a first embodiment of the present disclosure.

FIG. 1 is a structural schematic diagram of a multi-screen display management system provided by a first embodiment of the present disclosure, as shown in FIG. 1, the multi-screen display management system includes: a signal input module 1, a screen management module 2, a list modification module 3, a mode management module 4 and a driving module 5.

The number of the signal input module(s) 1 may be one, two, or more, and each signal input module 1 has a plurality of signal input ports.

The screen management module 2 is configured to store a screen management list. In the screen management list, a plurality of display screens are pre-defined and respective signal input ports corresponding to the display screens are recorded. The number of the display screens pre-defined in the screen management list should be larger than or equal to the maximum number of the display screens that a display device 6 can support. In the present embodiment, preferably, the number of the display screens pre-defined in the screen management list is equal to the maximum number of the display screens that the display device 6 can support.

The list modification module 3 is configured to modify the screen management list according to an operation of a user.

The mode management module 4 is configured to determine an active screen in the screen management list according to the operation of the user. The active screen refers to a display screen that is being displayed on the display device 6 currently, and a non-active screen refers to a display screen that is not being displayed on the display device 6 currently. In the embodiments of the present disclosure, it is preset that in the screen management list, the first n display screen(s) is (are) active screen(s) and the remaining display screen(s) is (are) non-active screen(s).

The driving module 5 is configured to drive the display device 6 to display each active screen according to the active screen determined by the mode management module 4 and the signal input port corresponding to each active screen recorded in the screen management list.

In the present embodiment, by creating the screen management list to establish the correspondence between each display screen and the signal input port, management of multi-screen display can be realized.

In order that those skilled in the art can better understand the technical solutions of the present disclosure, a management process of the multi-screen display will be exemplarily described below.

It is assumed that the maximum number of the display screens that the display device 6 can support is four, the number of display screens pre-defined in the screen management list is four, and the four display screens are referred to as Screen 1, Screen 2, Screen 3 and Screen 4, respectively. The number of signal input modules 1 is two, and the two signal input modules are referred to as a first signal input module and a second signal input module, respectively. The first signal input module includes three different signal input ports, which are referred to as Port A, Port C and Port E, respectively. The second signal input module includes three different signal input ports, which are referred to as Port B, Port D and Port F, respectively.

As an application scenario, the display device 6 is driven to implement multi-screen display.

Firstly, the user may allot a corresponding signal input port for each of the display screens predefined in the screen management list as required (i.e., user-customization), wherein each of the display screens is associated with its corresponding signal input port.

It is assumed that a pre-created screen management list is as shown in the following Table 1.

TABLE 1

| pre-created screen management list | |
| --- | --- |
| Display screen | Signal port |
| Screen 1 | Port A |
| Screen 2 | Port B |
| Screen 3 | Port C |
| Screen 4 | Port D |

In the present disclosure, the screen management list includes at least two fields, namely, "display screen" and "signal port". It can be seen from the above Table 1 that, Screen 1 corresponds to Port A, Screen 2 corresponds to Port B, Screen 3 corresponds to Port C, and Screen 4 corresponds to Port D.

It should be noted that, in the present embodiment, a corresponding signal input port may also be allocated for each display screen by default in the system.

Then, the mode management module 4 is configured to determine an active screen in the screen management list according to the operation of the user. A case where the user chooses the display device 6 to implement dual-screen display is taken as an example, and in this case, the mode management module 4 determines the first two display screen (i.e., Screen 1 and Screen 2) recorded in the screen management list to be active screens.

It should be noted that in the process of practically determining the active screens, the active screen(s) may be selected according to an order in which the display screens are stored in the screen management list. For example, when the user chooses the display device 6 to implement n-screen display, the mode management module 4 determines the first n display screen(s) recorded in the screen management list to be active screens.

Finally, the driving module 5 drives the display device 6 to display each active screen according to the active screen(s) determined by the mode management module 4 and the signal input port corresponding to each active screen recorded in the screen management list. The driving module 5 includes a signal input management unit 51, which is configured to establish a channel between the signal input port corresponding to each active screen recorded in the screen management list and the display device 6 so as to allow the signal input port corresponding to each active screen to input a corresponding data stream to the display device 6.

Specifically, the signal input management unit 51 establish channels between Ports A and B and the display device 6, Ports A and B can input corresponding data stream to the display device 6, respectively, and the display device 6 can simultaneously display Screen 1 and Screen 2 according to the received data streams, i.e., implement dual-screen display. There are various ways in the art for implementing that the display device 6 simultaneously displays corresponding screens according to multiple data streams, and the specific implementing process is not described in detail herein.

It should be noted that the case where the number of the signal input modules 1 is two, and each of the signal input modules 1 includes three signal input ports is exemplary only and does not limit the technical solutions of the present disclosure.

It can be seen from the above contents that the technical solutions of the present disclosure have no limitation on the number of the signal input module(s), and can thus be applicable to multi-screen display management in the case of multiple signal input modules 1. In addition, the technical solutions of the present disclosure also have no limitation on the maximum number of the display screens that the display device 6 can support, and thus have excellent universality and scalability. For example, in a case where the maximum number of the display screens that the display device 6 can support is changed from 4 to n, it only needs to change the number of the display screens defined in the screen management list from 4 to n under the condition that the number of the signal input ports is enough.

It should be noted that, in the present disclosure, more parameters can be set in the screen management list to realize extensive management of multi-screen display. Table 2 is a screen management list having multi-functions in the present disclosure.

TABLE 2

Screen management list having multi-functions

| Display screen | Signal port | Module | Is Port switch-able? | Maximum 2D res-olution | Maximum 3D res-olution |
|---|---|---|---|---|---|
| Screen 1 | Port A | First signal input module | Yes | 1080P | 540P |
| Screen 2 | Port B | Second signal input module | No | 1080P | 540P |

TABLE 2-continued

Screen management list having multi-functions

| Display screen | Signal port | Module | Is Port switch-able? | Maximum 2D res-olution | Maximum 3D res-olution |
|---|---|---|---|---|---|
| Screen 3 | Port C | First signal input module | Yes | all | all |
| Screen 4 | Port D | Second signal input module | Yes | 1080P | 540P |

Here, "module" indicates the module to which the signal input port corresponding to the display screen belongs, "is port switchable?" indicates whether the signal input port corresponding to the display screen is switchable (for example, it is defined in Table 2 that Screen 2 can only corresponds to Port B), "Maximum 2D resolution" indicates the maximum 2D resolution that the display screen can support, and "Maximum 3D resolution" indicates the maximum 3D resolution that the display screen can support.

The information of each display screen in the above Table 2 may be defined using the following data structure.

```
Struct winInput{
    int8 winIndex;      /*name of display screen*
    int8 Input;         /*corresponding signal input port*
    int8 moduleIndex;   /*module corresponding to signal input port*
    boolean select;             /*whether port is switchable*
    char *2D_solution;  /* Maximum supportable 2D resolution*
    char *3D_solution;  /* Maximum supportable 3D resolution*
};  /*define of the display screen*
winInput MW_table[windownum] /*define of screen management list*
```

It should be noted that the above case where the screen management list includes therein six fields, namely, "display screen", "signal port", "module", "is port switchable?", "maximum 2D resolution" and "maximum 3D resolution", is one possible case of the present embodiment only and used to assist the multi-screen display management system to implement corresponding management functions, and this case is exemplary only and is not intended to limit the technical solutions of the present disclosure.

In the present embodiment, optionally, a maximum supportable resolution (2D/3D resolution) corresponding to each of the display screens is also recorded in the screen management list, and the driving module 5 further includes: a resolution determination unit configured to determine whether the maximum supportable resolution corresponding to each of the active screens is smaller than a resolution of the data stream provided by the signal input port corresponding to the active screen; and when the resolution determination unit determines that the maximum supportable resolution corresponding to the active screen is smaller than the resolution of the data stream provided by the signal input port corresponding to the active screen, the display device 6 does not display the active screen.

In the present embodiment, optionally, one of the first signal input module and the second signal input module is a 2D signal input module, of which the signal input ports are each configured to provide a 2D video data stream, and the other is a 3D signal input module, of which the signal input ports are each configured to provide a 3D video data stream.

Screen 1 in Table 2 is taken as an example, and when the data stream provided by Port A has a 2D resolution larger than 1080P or a 3D resolution larger than 540P, Screen 1 does not display contents provided by Port A.

In the present embodiment, by providing the resolution determination unit, a screen whose resolution cannot be satisfied can be automatically excluded, so as to ensure display effect of the data stream provide by the corresponding port.

As another application scenario, when the display device 6 is displaying screen(s), the user selects a certain active screen on the display device 6 to undergo screen switching (port switching).

In this case, the user may modify the signal input port corresponding to the selected active screen in the screen management list correspondingly by using the list modification module 3. The modified screen management list is sent to the driving module 5 again, the signal input management unit switches the signal input port(s) according to the modified screen management list, and the switching of display contents of the active screen is completed.

In practical application, in the process of switching a screen by the user, it is likely that too many signal input ports in a same signal input module 1 need to input data streams to the display device 6 simultaneously, thereby resulting in that the signal input module 1 has too large load and may be damaged. For example, the signal input ports corresponding to four active screens displayed by the display device 6 are all from a same signal input module 1, and the maximum allowable port number of the signal input module 1 is three (the signal input module 1 can only bear at most three signal input ports to simultaneously input data streams to the display device 6), and in this case the signal input module 1 is overloaded.

To avoid occurrence of the above problem, in the present disclosure, it needs to be ensured that the number of signal input ports of each signal input module 1 recorded in the screen management list is smaller than or equal to the maximum allowable port number of the signal input module 1. For example, the maximum allowable port number of a certain signal input module 1 is three, as such, the number of the signal input ports belonging to the signal input module 1 recorded in the screen management list cannot exceed three at any time (including the time when the list is being pre-created and the time when the list is being modified).

During the time when the list is being pre-created, it is easy to ensure that the number of the signal input ports of the signal input module 1 recorded in the screen management list is smaller than or equal to the maximum allowable port number of the signal input module 1. However, during the time when the list is being modified, it is difficult to ensure that the number of the signal input ports of the signal input module 1 recorded in the screen management list is smaller than or equal to the maximum allowable port number of the signal input module 1.

Figure 2:
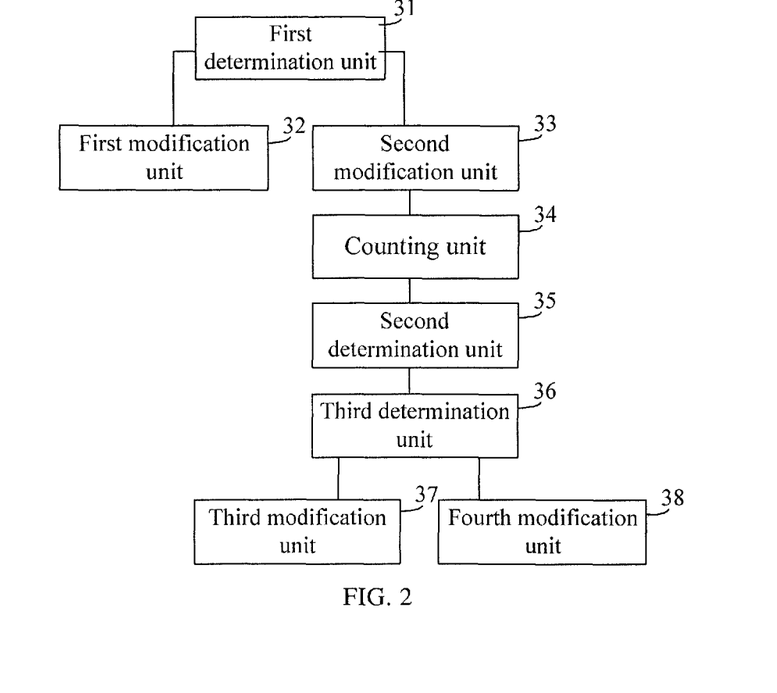
FIG. 2 is a structural schematic diagram of a list modification module of the present disclosure.

FIG. 2 is a structural schematic diagram of a list modification module of the present disclosure, as shown in FIG. 2, in order to solve the above technical problem, optionally, the list modification module 3 includes: a first determination unit 31, a first modification unit 32, a second modification unit 33, a counting unit 34, a second determination unit 35, a third determination unit 36, a third modification unit 37 and a fourth modification unit 38.

The first determination unit 31 is configured to determine, when the user chooses to switch a current input port corresponding to a selected active screen on the display device 6 to a target input port, whether a non-active screen that takes the target input port as its corresponding signal input port exists in the screen management list.

The first modification unit 32 is configured to modify the signal input port corresponding to the active screen selected by the user in the screen management list to be the target input port and modify the signal input port corresponding to the said non-active screen to be the current input port when the first determination unit 31 determines that the non-active screen that takes the target input port as its corresponding signal input port exists in the screen management list.

The second modification unit 33 is configured to modify the signal input port corresponding to the active screen selected by the user in the screen management list to be the target input port when the first determination unit 31 determines that the non-active screen that takes the target input port as its corresponding signal input port does not exist in the screen management list.

The counting unit 34 is configured to count a total number of signal input ports that belong to the signal input module 1 which includes the target input port in the modified screen management list after the second modification unit 33 has modified the screen management list.

The second determination unit 35 is configured to determine whether the counted total number of signal input ports is larger than a maximum allowable port number of the signal input module 1 which includes the target input port.

The third determination unit 36 is configured to determine whether a non-active screen whose corresponding signal input port belongs to the same signal input module 1 as the target input port exists in the screen management list when the second determination unit 35 determines that the counted total number of signal input ports is larger than the maximum allowable port number of the signal input module 1 which includes the target input port.

The third modification unit 37 is configured to select from the screen management list one non-active screen whose corresponding signal input port belongs to the same signal input module 1 as the target input port and modify the signal input port corresponding to said one non-active screen to be the current input port when the third determination unit 36 determines that the non-active screen whose corresponding signal input port belongs to the same signal input module 1 as the target input port exists in the screen management list.

The fourth modification unit 38 is configured to modify the signal input port corresponding to the active screen selected by the user in the screen management list from the target input port to the current input port when the third determination unit 36 determines that the non-active screen whose corresponding signal input port belongs to the same signal input module 1 as the target input port does not exist in the screen management list.

For ease of understanding for those skilled in the art, exemplary description is given below in relation to an example.

It is assumed that the maximum allowable port number of each of the first signal input module and the second signal input module is two, and the screen management list before the user performs screen switching is as shown in the above Table 1. A case where the user switches display picture of Screen 1 (the current input port is Port A) is taken as an example, and the following situations may occur.

Situation 1: the user wants to switch Port A corresponding to the active Screen 1 to Port C or Port D (the target input port is Port C or Port D).

Because Port C is the signal input port corresponding to the non-active Screen 3, and Port D is the signal input port corresponding to the non-active Screen 4, the first modification unit 32 may directly modify the signal input port corresponding to the active Screen 1 to be Port C or Port D, and modify the signal input port (i.e., Port C or Port D) corresponding to the non-active Screen 3 or non-active Screen 4 to be Port A.

In the above modification process, position exchange of any two signal input ports in the screen management list will not lead to that the number of signal input ports, recorded in the screen management list, of a certain signal input module 1 exceeds the maximum allowable port number of said signal input module 1.

Situation 2: the user wants to switch Port A corresponding to the active Screen 1 to Port E.

Firstly, the first determination unit 31 determines that the non-active screen that takes the target input port as its corresponding signal input port does not exist in the screen management list, the second modification unit 33 modifies the signal input port corresponding to the active Screen 1 to be Port E; next, because Port E belongs to the first signal input module, the counting unit 34 may count the total number of signal input ports belonging to the first signal input module in the screen management list, and the counted total number is two (Port E and Port C); subsequently, the second determination unit 35 determines that the counted total number is equal to the maximum allowable port number (two) of the first signal input module, which means that the modified screen management list satisfies the requirement.

Situation 3: the user wants to switch Port A corresponding to the active Screen 1 to Port F.

Firstly, the first determination unit 31 determines that the non-active screen that takes the target input port as its corresponding signal input port does not exist in the screen management list, the second modification unit 33 modifies the signal input port corresponding to the active Screen 1 to be Port F; next, because Port F belongs to the second signal input module, the counting unit 34 may count the total number of signal input ports belonging to the second signal input module in the screen management list, and the counted total number is three (Port B, Port D and Port F); subsequently, the second determination unit 35 determines that the counted total number is larger than the maximum allowable port number (two) of the second signal input module, which means that the modified screen management list does not satisfy the requirement and needs to be further modified; then the third determination unit 36 determines that the non-active Screen 4 whose corresponding signal input port (Port D) belongs to the same signal input module 1 as Port F exists in the screen management list; and finally, the third modification unit 37 modifies the signal input port corresponding to the non-active Screen 4 to be Port A.

At this point, the number of the signal input ports, recorded in the screen management list, of each signal input module 1 is smaller than or equal to the maximum allowable port number of the signal input module 1.

In addition, it should be noted that when the third determination unit 36 determines that a plurality of non-active screens whose corresponding signal input ports belong to the same signal input module 1 as the target input port exist in the screen management list, one non-active screen whose corresponding signal input port belongs to the same signal input module 1 as the target input port may be selected from the plurality of non-active screens arbitrarily, and the signal input port corresponding to said one non-active screen is modified.

When the third determination unit 36 determines that the non-active screen whose corresponding signal input port belongs to the same signal input module 1 as the target input port does not exist in the screen management list, it indicates that the screen management list cannot be further modified, the signal input port corresponding to the active screen selected by the user in the screen management list is reverted from the target input port back to the current input port, and the user is prompted that the selected active screen cannot be switched to the screen corresponding to the target input port.

It should be noted that, after the first modification unit 32 completes modification of the screen management list, or the second determination unit 35 determines that the counted total number is smaller than or equal to the maximum port number of the signal input module 1 including the target input port, or the third modification unit 37 completes modification of the screen management list, the driving module 5 needs to drive the display device 6 according to the modified screen management list, so as to switch the active screen selected by the user in the display device 6 to the screen corresponding to the target input port, thereby completing the screen switching.

It can be seen from the above contents that the technical solutions of the present disclosure can effectively avoid the problem that the signal input module 1 has too large load and may be damaged during the process of screen switching by the user.

In the present embodiment, optionally, the multi-screen display management system further includes: an alternative port generation module 9 configured to generate an alternative port list corresponding to each of the active screens according to the screen management list, and in the alternative port list corresponding to an active screen, a signal input port other than the signal input port corresponding to the active screen and a specific signal input port preset in the screen management list is recorded.

Taking the case shown in Table 1 as an example, it is assumed that a specific signal input port preset for the active Screen 1 is Port F (Screen 1 cannot correspond to Port B), and no specific signal input port is set for the active Screen 2. In this case, the alternative port list created by the alternative port generation module for the active Screen 1 may include Port C, Port D and Port E, and the alternative port list created by the alternative port generation module for the active Screen 2 may include Port C, Port D, Port E and Port F.

The alternative port list may provide possible signal input port(s) to which the signal input port corresponding to the active screen selected by the user may be switched, and when screen switching is performed on a certain active screen, the alternative port list of each active screen may be changed accordingly.

Optionally, the multi-screen display management system further comprises: a screen processing module 7 and a multi-screen display matrix module 8. The screen processing module 7 is configured to adjust a size of each active screen displayed on the display device 6. The multi-screen display matrix module 8 is configured to adjust layout of the active screens displayed on the display device. In the present disclosure, by providing the screen processing module 7 and the multi-screen display matrix module 8, the entire screen composing of multiple display screens is editable, and operability by the user is improved.

The multi-screen display management system provided by the present disclosure can be applied to scenarios such as remote medical diagnosis, medical room and teaching.

Second Embodiment

Figure 3:
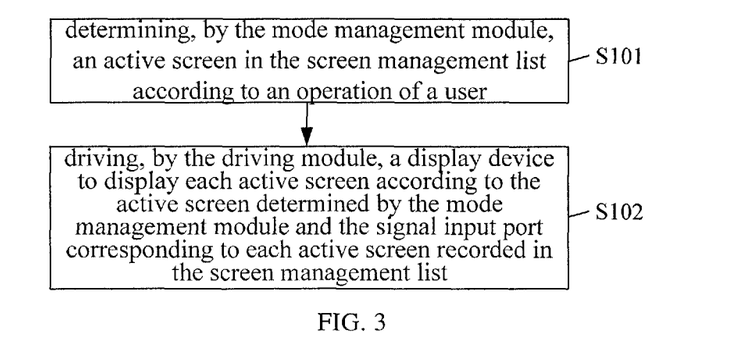
FIG. 3 is a flow chart of a display driving method provided by a second embodiment of the present disclosure.

FIG. 3 is a flow chart of a display driving method provided by a second embodiment of the present disclosure, as shown in FIG. 3, the display driving method is based on the multi-screen display management system in the first embodiment, the specific description of the multi-screen display management system may refer to that in the first embodiment and is not repeatedly given herein, and the display driving method includes:

step S101: determining, by the mode management module, an active screen in the screen management list according to an operation of a user; and step S102: driving, by the driving module, a display device to display each active screen according to the active screen determined by the mode management module and the signal input port corresponding to each active screen recorded in the screen management list.

Descriptions of the above steps S101 and S102 may refer to the descriptions of implementation of driving management of multi-screen display of the multi-screen display management system in the first embodiment, and are not repeatedly given herein.

Third Embodiment

Figure 4:
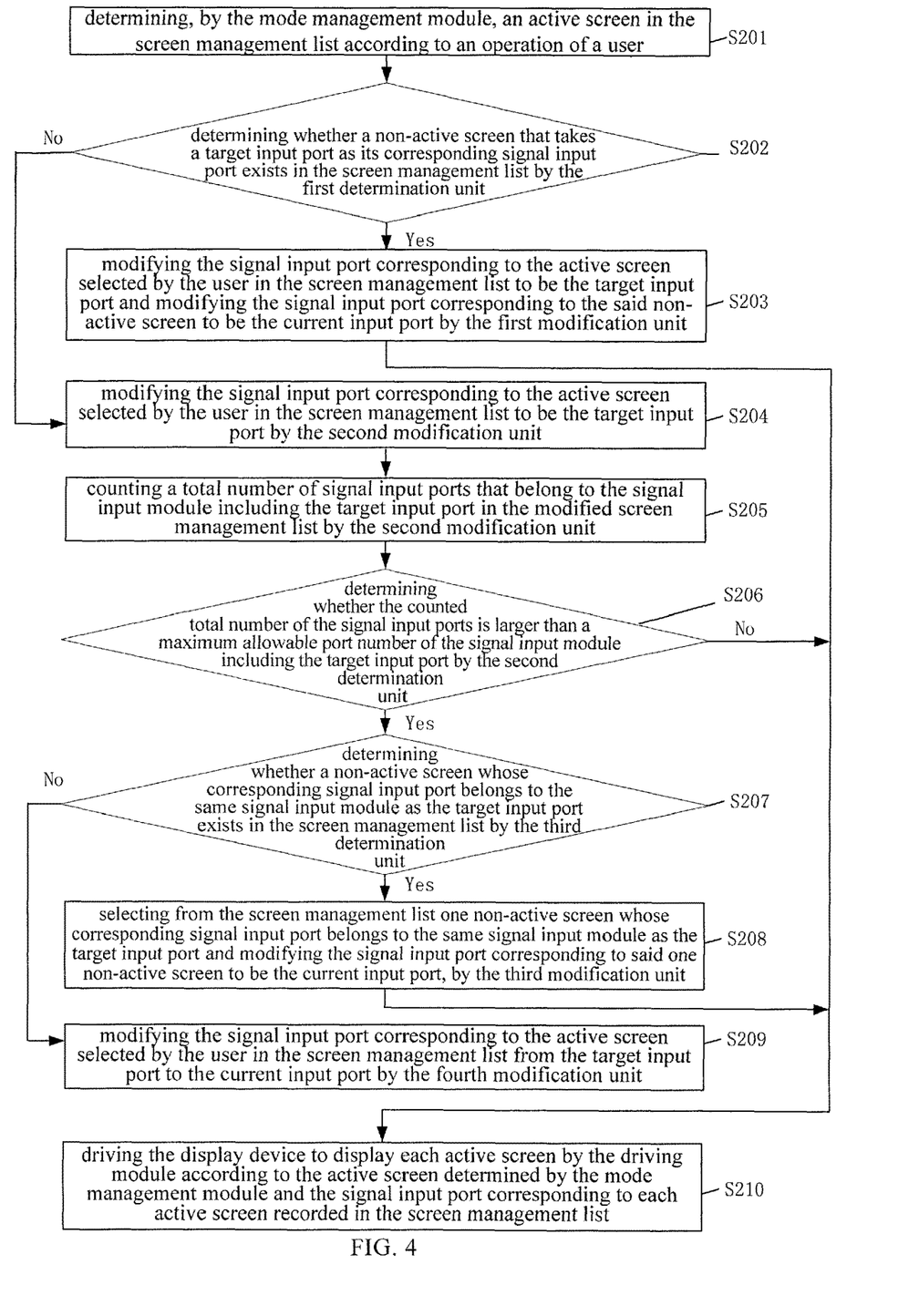
FIG. 4 is a flow chart of a screen switching method provided by a third embodiment of the present disclosure.

FIG. 4 is a flow chart of a screen switching method provided by a third embodiment of the present disclosure, as shown in FIG. 4, the screen switching method is based on the multi-screen display management system in the first embodiment, and the list modification module in the multi-screen display management system includes a first determination unit, a first modification unit, a second modification unit, a counting unit, a second determination unit, a third determination unit, a third modification unit and a fourth modification unit, and the screen switching method includes the following steps.

Step S201 includes: determining, by the mode management module, an active screen in the screen management list according to an operation of a user.

Step S202 includes: determining, by the first determination unit, whether a non-active screen that takes a target input port as its corresponding signal input port exists in the screen management list when the user chooses to switch a current input port corresponding to a selected active screen on the display device to the target input port.

When it is determined in step S202 that the non-active screen that takes a target input port as its corresponding signal input port exists in the screen management list, it proceeds to step S203; otherwise, it proceeds to step S204.

Step S203 includes: modifying, by the first modification unit, the signal input port corresponding to the active screen selected by the user in the screen management list to be the target input port, and modifying the signal input port corresponding to the said non-active screen to be the current input port.

After completion of step S203, it proceeds to step S210.

Step S204 includes: modifying, by the second modification unit, the signal input port corresponding to the active screen selected by the user in the screen management list to be the target input port.

Step S205 includes: counting, by the counting unit, a total number of signal input ports that belong to the same signal input module as the target input port in the modified screen management list.

Step S206 includes: determining, by the second determination unit, whether the counted total number of signal input ports is larger than a maximum allowable port number of the signal input module which includes the target input port.

When it is determined in step S206 that the total number counted in step S205 is larger than the maximum allowable port number of the signal input module which includes the target input port, it proceeds to step S207; otherwise, it proceeds to step S210.

Step S207 includes: determining, by the third determination unit, whether a non-active screen whose corresponding signal input port belongs to the same signal input module as the target input port exists in the screen management list.

When it is determined in step S207 that the non-active screen whose corresponding signal input port belongs to the same signal input module as the target input port exists in the screen management list, it proceeds to step S208; otherwise, it proceeds to step S209.

Step S208 includes: selecting from the screen management list one non-active screen whose corresponding signal input port belongs to the same signal input module as the target input port and modifying the signal input port corresponding to said one non-active screen to be the current input port, by the third modification unit.

After completion of step S208, it proceeds to step S210.

Step S209 includes: modifying, by the fourth modification unit, the signal input port corresponding to the active screen selected by the user in the screen management list from the target input port to the current input port.

It should be noted that after completion of step S209, there is no need to perform screen switching because the screen management list is not changed, and in this case, the display device may prompt the user that the selected active screen cannot be switched to the screen corresponding to the target input port.

Step 210 includes: driving, by the driving module, the display device to display each active screen according to the active screen determined by the mode management module and the signal input port corresponding to each active screen recorded in the screen management list.

In step S210, after being driven by the driving module, the active screen in the display device selected by the user is switched to the screen corresponding to the target input port, that is, screen switching is realized.

The descriptions of the above steps S201 to S219 may refer to those of implementation of screen switching management of the multi-screen display management system in the first embodiment, and are not repeatedly given herein.

It could be understood that the foregoing implementations are merely exemplary implementations used for describing the principle of the present disclosure, but the present disclosure is not limited thereto. For those skilled in the art, various modifications and improvements can be made without departing from the spirit and essence of the present invention, and these modifications and improvements are also deemed as falling into the protection scope of the present disclosure.

The invention claimed is:

1. A screen switching method, the screen switching method being performed by a multi-screen display management system comprising:
   a plurality of signal input devices, each of which comprises a plurality of signal input ports;
   a memory, which stores a screen management list, wherein in the screen management list, a correspondence between a plurality of display screens and the plurality of signal input ports is predefined;
   the method comprising:
   modifying the correspondence between the plurality of display screens and the plurality of signal input ports, to generate a modified correspondence;
   determining an active screen in the screen management list according to an operation of a user, wherein the determined active screen is a display screen that is being displayed on a display device currently, and a non-active screen is a display screen that is not being displayed on the display device currently; and according to the modified correspondence and the determined active screen, selecting a signal input port corresponding to the determined active screen, and to drive the display device to display the determined active screen according to a display signal inputted through the selected signal input port, wherein the screen switching method further comprises:

determining, whether a non-active screen that takes a target input port as its corresponding signal input port exists in the screen management list when the user chooses to switch a current input port corresponding to a selected active screen on the display device to the target input port;

modifying the signal input port corresponding to the determined active screen selected by the user to be the target input port in the screen management list when the determined non-active screen that takes the target input port as its corresponding signal input port does not exist in the screen management list;

counting a total number of signal input ports that belong to the signal input device comprising the target input port in a modified screen management list after the screen management list has been modified;

determining whether the counted total number of signal input ports is larger than a maximum allowable port number of the signal input device comprising the target input port; and driving the display device to display each determined active screen according to the display signal inputted through the signal input port corresponding to each active screen recorded in the modified screen management list, when the counted total number of signal input ports is determined as smaller than or equal to the maximum allowable port number of the signal input device comprising the target input port.

2. The screen switching method according to claim 1, further comprising:

modifying the signal input port corresponding to the determined active screen selected by the user to be the target input port and the signal input port corresponding to the determined non-active screen to be the current input port in the screen management list, when the determined non-active screen that takes the target input port is determined as its corresponding signal input port exists in the screen management list; and driving the display device to display each determined active screen according to the display signal inputted through the signal input port corresponding to each active screen recorded in the modified screen management list.

3. The screen switching method according to claim 2, wherein the screen switching method further comprises:

determining whether a non-active screen whose corresponding signal input port belongs to the same signal input device as the target input port exists in the screen management list when the counted total number of signal input ports is determined as larger than the maximum allowable port number of the signal input device comprising the target input port;

selecting, from the screen management list, one non-active screen whose corresponding signal input port belongs to the same signal input device as the target input port and modifying the signal input port corresponding to said one non-active screen to be the current input port, when the non-active screen whose corresponding signal input port belongs to the same signal input device determined as the target input port existing in the screen management list;

driving the display device to display each determined active screen according to the display signal inputted through the signal input port corresponding to each active screen recorded in a second modified screen management list, after the modified screen management list has been modified; and modifying the signal input port corresponding to the determined active screen selected by the user from the target input port to the current input port in the screen management list when the non-active screen whose corresponding signal input port belongs to the same signal input device as the target input port does not exist in the screen management list.

* * * * *